United States Patent

Draugelates

[11] Patent Number: 6,095,252
[45] Date of Patent: Aug. 1, 2000

[54] MEANS FOR FIGHTING FIRE IN AT LEAST ONE CABLE OR LINE RUN

[75] Inventor: Gerhard Draugelates, Ottobrunn, Germany

[73] Assignee: Siemens Aktiengesellschaft, Munich, Germany

[21] Appl. No.: 09/180,694

[22] PCT Filed: May 22, 1997

[86] PCT No.: PCT/DE97/01031

§ 371 Date: Nov. 13, 1998

§ 102(e) Date: Nov. 13, 1998

[87] PCT Pub. No.: WO97/44874

PCT Pub. Date: Nov. 27, 1997

[30] Foreign Application Priority Data

May 22, 1996 [DE] Germany .......................... 196 20 623

[51] Int. Cl.⁷ .................................................. A62C 37/14
[52] U.S. Cl. .......................................................... 169/58
[58] Field of Search .................................. 169/57, 58, 16, 169/23, 56, 54; 138/137, 138, 129, 143

[56] References Cited

U.S. PATENT DOCUMENTS

| | | | |
|---|---|---|---|
| 2,382,120 | 8/1945 | White | 169/57 |
| 4,186,778 | 2/1980 | Carey | 138/103 |
| 4,232,742 | 11/1980 | Dick | 169/57 |
| 4,559,973 | 12/1985 | Hane et al. | 138/138 |
| 5,276,433 | 1/1994 | Booker et al. | 169/57 |
| 5,476,121 | 12/1995 | Yoshikawa et al. | 138/138 |

FOREIGN PATENT DOCUMENTS

| | | |
|---|---|---|
| 0 077 679 | 4/1983 | European Pat. Off. . |
| 23 63 560 | 8/1974 | Germany . |
| 27 45 370 | 4/1979 | Germany . |
| 33 37 532 | 5/1985 | Germany . |
| 0107195 | 8/1979 | Japan ........................ 169/57 |
| 1472072 | 1/1989 | U.S.S.R. ..................... 169/57 |
| 1 357 010 | 6/1974 | United Kingdom . |
| WO 91/08022 | 6/1991 | United Kingdom ...... 169/57 |

OTHER PUBLICATIONS

Brochure from Walther & Cie. AG on "Sprühflutanlagen für Transformatoren und Kabelkanäle".

Primary Examiner—Andres Kashnikow
Assistant Examiner—Jorge Bocanegra
Attorney, Agent, or Firm—Hill & Simpson

[57] ABSTRACT

A device for fighting fires in at least one cable or line run At least one pipe, which contains a fire-extinguishing agent under positive pressure, is laid in at least one cable or line run. The wall of this pipe is produced from a material whose melting point is chosen to be lower than the ignition point of the cable sheath of an adjacent cable.

16 Claims, 3 Drawing Sheets

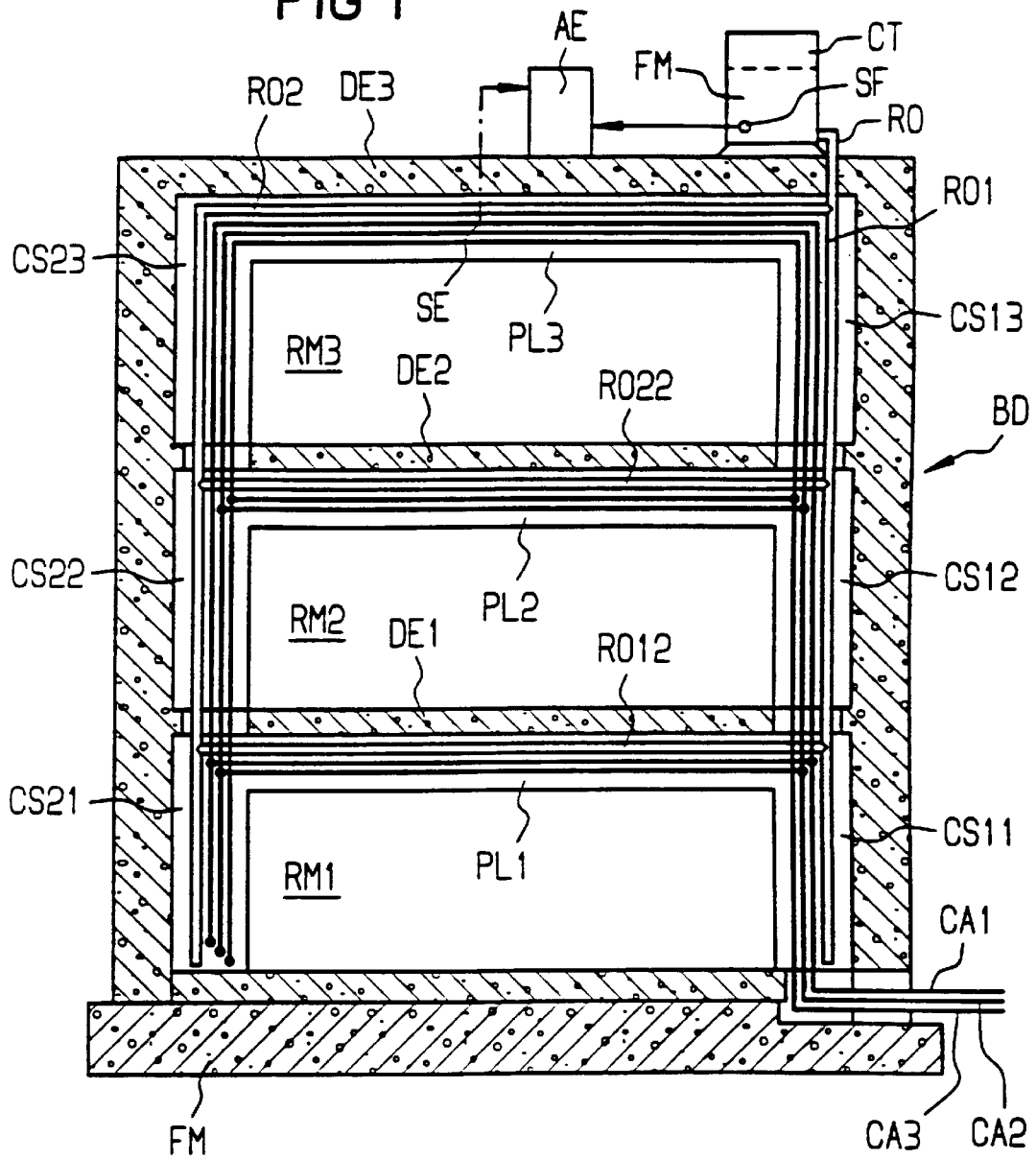

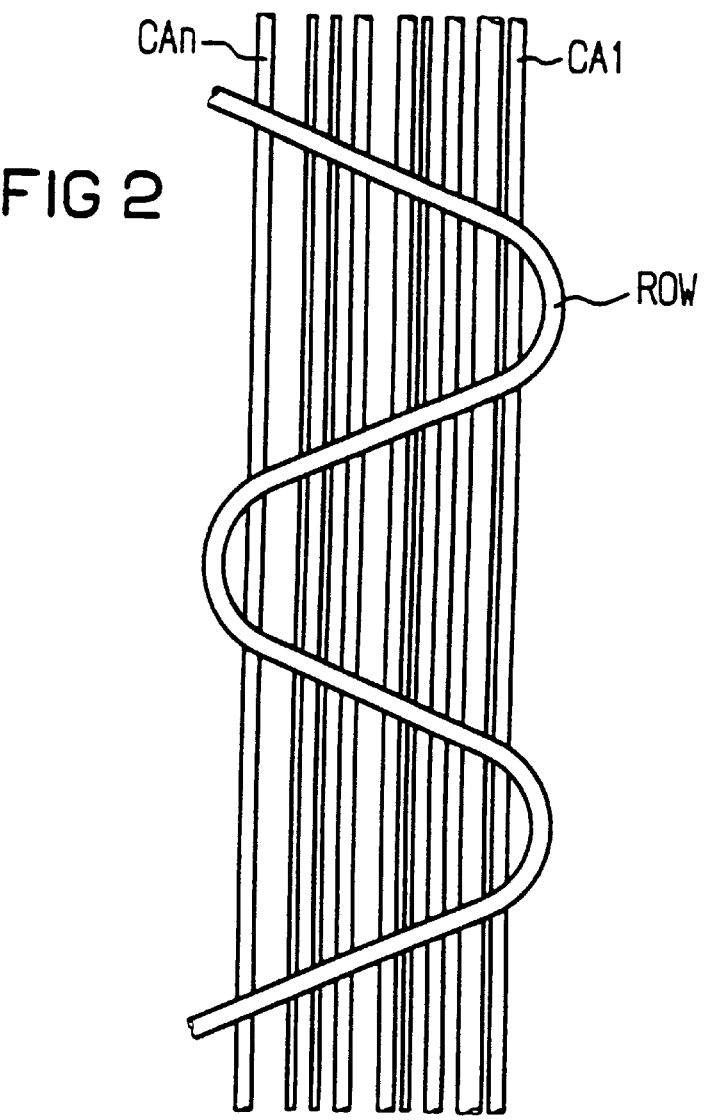
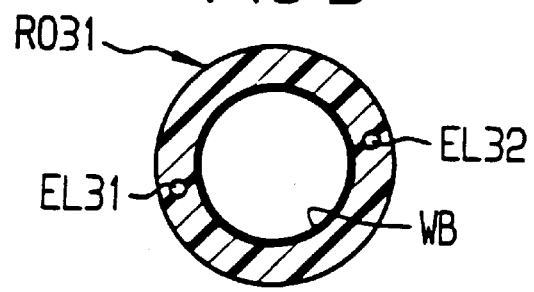

MEANS FOR FIGHTING FIRE IN AT LEAST ONE CABLE OR LINE RUN

BACKGROUND OF THE INVENTION

The invention relates to a means or device for fighting fire in at least one cable or line run containing a cable and/or a line, at least one pipe, which contains a fire-extinguishing agent under positive pressure and is laid continuously in the cable or line run, and the wall of this pipe is produced from a material whose melting point is chosen to be equal to or lower than the ignition point of the cable sheath or the line.

A means of this type is disclosed by DE-A1-27 45 370.

The brochure from Walther & Cie. AG on "Sprühflutanlagen für Transformatoren und Kabelkanäle" [Spray flooding systems for transformers and cable ducts] 3/72 discloses an extinguishing device in which a pipe which has a large number of extinguishing nozzles is laid in a cable duct. In the event of fire, a liquid extinguishing agent is forced into the pipe from a central control point and is thus sprayed out by the spray nozzles. Since the entire system, or at least in each case a relatively large part thereof, is placed under pressure, the extinguishing agent emerges within the entire system, or within a relatively large part thereof, and the cable duct is flooded.

EP-A2 0 077 679 discloses a fire-protection system in which a cable duct has a large number of small flexible containers having coverings made from a crosslinked polymer material. These small containers contain a nonflammable liquid, in particular water. The coverings are constructed somewhat like a cushion and are arranged one behind the other. If a fire breaks out, then the heat produced is to a certain extent absorbed by the evaporation of the liquid in the interior of the small containers, without the latter bursting. In this way, since heat is drawn off, the action of the heat may last longer. If the heat rises further, then the covering of some of the small containers tears apart, and the evaporated liquid flows out. The small containers are expediently only partly filled with the liquid, so that they can expand to a greater extent. However, the production of such small containers that are filled with a liquid and lined up in a row is extremely complicated.

DE-A1 33 37 532 discloses an extinguishing device having a container which is intended to accommodate an extinguishing agent that is under pressure, and to which there is connected a piece of pipe which, in the region of its end, is closed by a wall. This wall consists of a material which dissolves or liquefies when a predetermined temperature is exceeded.

U.S. Pat. No. 5,276,433 discloses a temperature sensor which is incorporated, for example, in the outlet of a ventilation system. It contains a pipe which consists of plastic and is filled with a liquid under pressure. When this pipe is subjected to a high temperature, the liquid in the interior of the pipe begins to boil and the pipe bursts, the pressure drop which is produced, is used to close the ventilator flaps.

GB-A 1 357 010 discloses a fire-extinguishing device which is intended to be incorporated in a housing that is exposed to the risk of fire. It is possible for the housing to contain, for example, a television receiver, a computer, a photocopier, an office machine or a motor. Laid in the housing is a pipe which contains a liquid fire-extinguishing agent under pressure. In the event of fire, the pipe becomes soft, bursts and the liquid flows out.

In the case of a means for fighting fires, which means has at least one pipe which contains a fire-extinguishing agent under pressure and the wall is of a material with a melting point that is equal to or less than the ignition point of the cable sheath or line. The extinguishing agent must be kept in the pipes for a long period of time. During these long standing times, the extinguishing agent may undergo changes.

SUMMARY OF THE INVENTION

The invention is therefore based on the object of indicating a way in which such changes can be avoided to the greatest possible extent, and thus the service life of the extinguishing-agent system can be improved.

In the case of a means for fighting fire according to the invention, this object is achieved in that the pipe is equipped with a water vapor barrier.

As a result of the pipe which contains the extinguishing agent being equipped with a water vapor barrier, the diffusion of water or water vapor through the pipe wall is prevented, so that the service life of the extinguishing agent can be kept very long. In the case of hygroscopic extinguishing agents, the water vapor barrier has the advantage that it is less easily possible for clumping to occur, since moisture that is present on the outside (for example moisture in the air) cannot pass to the inside to the fire-extinguishing agent. If a liquid extinguishing agent is used, there is an advantage insofar as this cannot emerge to the outside from the pipe interior, so that losses of fire-extinguishing agents can be avoided to the greatest possible it is also possible in this way, for extinguishing agents under pressure, for the operating pressure to be better maintained as well.

BRIEF DESCRIPTION OF THE DRAWINGS

FIG. 1 is a schematic cross sectional view of a building that is provided with a fire-protection means according to the invention, FIG. 2 is a plan view of an embodiment of how a pipe can be fitted above the cables in a cable duct and FIGS. 3 to 5 are cross sectional views of three embodiments of pipes which are provided with signal conductors and, if appropriate, with a water vapor barrier and are intended for carrying the extinguishing agent.

DESCRIPTION OF THE PREFERRED EMBODIMENTS

Figure 4:
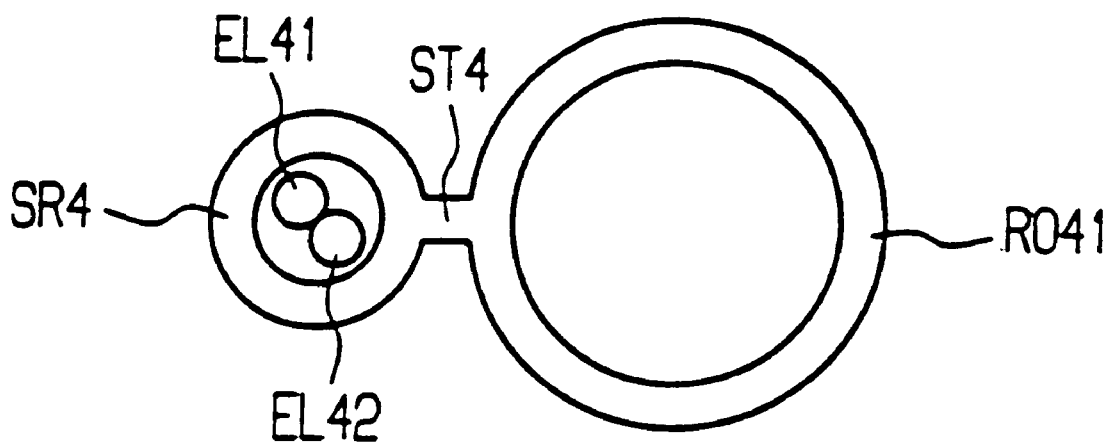

FIG. 1 illustrates a building BD, that has three rooms RM1, RM2, RM3 that are located one above another. At least one cable, which may be constructed as 15 a telecommunications cable and/or as a power supply cable, enters this building via the foundation FM. In the present example, it is assumed that three cables CA1–CA3 are fed in. In general, these cables, which generally come in underground, are fed to distributors and from there are led on further via distribution or branching cables. In the present example, these distributors have been left out in order to give a clearer illustration, and the cables are depicted schematically as being fed directly to the individual rooms. In the building itself, vertically running cable ducts CS11 and CS21 (on either side of the room RM1), CS12 and CS22 (on either side of the room RM2) and CS13 and CS23 (on either side of the room RM3) are illustrated as cable or line runs. These vertically running cable ducts are usually covered over with respect to the interior of the room by a wall, lining or the like and constitute a chimney-like structure which, in the event of a fire, passes on the fire particularly quickly.

In the present example, it is assumed that the cables CA1–CA3 are laid as ring lines, that is to say are also led wholly or partially over the respective ceilings, to the opposite side, or to a different side, of the room, for example on cable trays or cable racks. The cables thus run horizontally underneath the ceiling, in the so called plenum, in a cable or line run, which is designated in each case by PL1 for room RM1, PL2 for room RM2 and PL3 for room RM3.

In the event of a short circuit within the cable system, or in the event of overheating or the outbreak of fire in one of the rooms, there is the risk that one or all of the cables CA1–CA3 will catch fire and, because of the wide distribution of the cable ducts CS11–CS21 and/or of the ceiling ducts PL1–PL3, a rapid spread of fire will take place. This is remedied in that, in the respective cable ducts CS11–CS21, at least one pipe with a fire-extinguishing agent is laid over, between or under the cables (that is to say as close as possible and, as far as possible, also in physical contact). The pipe material has a lower melting point than the ignition point of the sheathing materials or the temperature at which the cable sheath begins to burn for the cables CA1–CA3. If these cable sheaths have different ignition points (for example because they consist of different materials), then the melting point of the raw material carrying the extinguishing agent is advantageously to be chosen such that said raw material malts at the ignition point of the cable sheath with the lowest ignition point. This pipe, filled with extinguishing agent, should be under pressure, which in the present example is realized in a simple manner by a storage container CT being installed on the roof of the building BD and being filled with an extinguishing agent FM, which is preferably a liquid. Connected to this container CT is a pipe RO, which, in the present example, divides into two pipes RO1 and RO2 after passing through the uppermost building ceiling DE3. These pipes RO1 and RO2 are advantageously extending through all the cable ducts CS11 to CS21 and expediently also through the horizontally running ceiling ducts PL1 to PL3, and now in the vicinity of the cables. In the present example, it in assumed that the two pipe systems RO1 and RO2 are also connected to each other as ring lines, that is to say the pipes RO22 and RO12 running in the intermediate ceilings each connect the vertically running pipe strings RO1 and RO2 to each other. This has, for example, the advantage that, with a given pipe cross section, virtually twice the amount of extinguishing agent can emerge at the respective point of a fire if the latter is located in the ceiling region. The fire-fighting means can also be modified in such a way that a plurality of storage containers are provided in a building, in particular at different heights (for example in each story, and are then advantageously assigned separate pipe systems.

Because of the relatively low melting point of the pipe wall of the pipe system, in the event of a fire breaking out the respective pipe will melt, burst or break open precisely at the point where the flame occurs and, as a result, clears the path for the extinguishing agent FM to flow out. As a result of the relatively high pressure of the extinguishing agent, the latter is sprayed out over a relatively large area, and the source of the fire is thus quickly and reliably extinguished in this way.

Suitable extinguishing agents are fire-extinguishing liquids (for example water), gases (for example nitrogen) and also pulverulent extinguishing agents, such as the extinguishing agents used in the known hand-operated fire extinguishers. Furthermore, it is also possible to provide an extinguishing foam or agent, or its basic substances, in the interior of the pipe. This foam then emerges at the point of the fire to specifically fight and extinguish the fire locally. Foam extinguishing agent of this type in some cases have the added advantage that, once the fire has been extinguished, the fire-extinguishing agent also ceases to emerge.

The installation of the cable systems within the building or the plant can be modified in many ways and is not restricted to the schematic distribution structure illustrated in FIG. 1. For example, it is possible to provide just one vertical cable or line run CS11 to CS13, from which the cables are distributed over the room in the manner of spur lines, for example via the ceiling distribution systems PL1–PL3, while dispensing with a left-hand cable or line run corresponding to CS21 to CS23. Furthermore, it is possible, in addition to or else instead of ceiling distribution systems, for the cables to be provided in the floors of the respective rooms. Equally, it is also possible to protect cable or line systems in mobile areas, such as in vehicles (for example underground trains), the vehicle corresponding, for example, to one of the illustrated rooms. It is also possible for lines, such as control lines, to be laid instead of or together with the cables. In this case, the melting point of the pipe carrying the extinguishing agent should be based on the ignition point of the insulation of the lines, that is to say should be chosen to be equal to or lower than the latter.

The pressure in the pipeline system RO1 and RO2 can also be produced in a manner other than hydrostatically. For example appropriate pressure containers and pressure pumps can be provided and these will take over or control the necessary additional delivery of the extinguishing agent as required when a pressure drop resulting from a fire with emergence of extinguishing agent occurs.

FIG. 2 shows that, in particular in the case of cable ducts having a large number of cables, it is expedient if, rather than being guided rectilinearly and essentially parallel to the individual cables CA1 to CAn, the pipe ROW carrying the extinguishing agent is guided in a serpentine fashion and preferably over the entire width of the bundle of cables, by which means the space area filled by the cables CA1 to CAn can be covered better. It is also possible for the pipe ROW with the extinguishing liquid under pressure to be wound around the bundle of cables CA1 to CAn in the manner of a helical coil, and an a result for particularly good monitoring and a reliable extinguishing function to be achieved. Close physical contact between the pipe ROW and the cables CA1 to CAn to be protected is expedient.

FIG. 3 illustrates is a cross section through a fire-protection pipe RO31 in the sense of the invention. The wall of this pipe RO31 expediently consists of plastic material, it being advantageously possible to use polyethylene in particular, since its melting point is lower than that of most PVC-sheathed cables used hitherto. Even when the laid cables are sheathed with polyethylene, the pipe RO31 is destroyed in the event of a fire as a result of its lower melting point, and the extinguishing agent contained therein emerges. This process can be accelerated further if a polyethylene with a particularly low melting point is used for the pipe RO31. In order to prevent moisture from permeating into the pipe, it is advantageous, when hygroscopic extinguishing agents are used to provide the pipe on the inside with a very thin-walled water vapor barrier WB, for example made of aluminum and/or plastic film. This water vapor barrier can also be applied to the outside or embedded in the wall of the pipe RO31.

It is expediently possible for monitoring devices, for example in the form of electric conductors EL31 and EL32 or dielectric conductors, to be connected to the pipe. In the cross-sectional illustration of FIG. 3, these are embedded in the wall material (for example on opposite sides of the pipe RO31), and can advantageously be used for signaling or for control. The electric conductors can also be embedded in the pipe wall so that they run helically.

Figure 5:
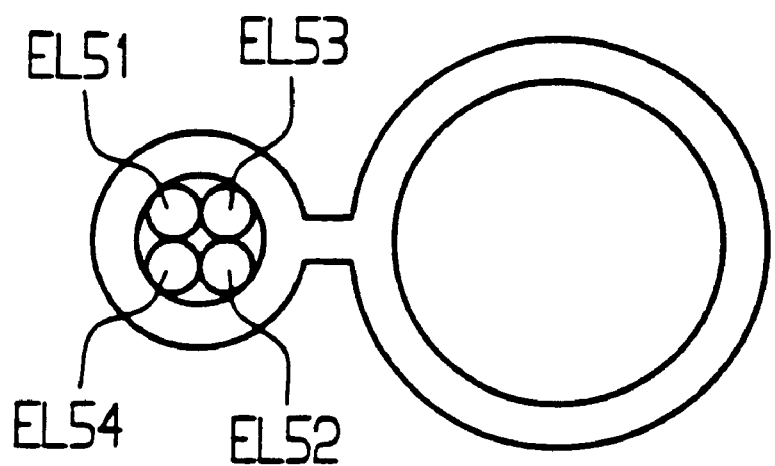

In FIG. 4, two, preferably twisted together, electric conductors EL41 and EL42 are accommodated in a small pipe SR4 that is connected to the pipe RO41 via a web ST4. In FIG. 5, four conductors EL51 to EL54 of this type are provided. It is also possible to construct or use the conductors EL51 to EL54 as a telecommunications cable. Electric shielding of the conductors can also expediently be provided, for example by means of a thin metal foil.

In the event of a fire breaking out, there is a change in the pressure within the extinguishing-line system. This pressure change can be used in an alarm device AE, by means of a sensor (designated by SF in FIG. 1) assigned to the extinguishing system, for example in the form of a signal generator, a manometer or the like, to trigger a fire alarm or to report to a fire station.

It is also possible for the change in electrical properties, for example of the insulation resistance between conductors assigned to the pipes, to be determined and, as indicated by SE in FIG. 1, to be forwarded to the alarm device AE.

The response of a sensor (for example signal generator and/or pressure manometer) can be forwarded to the alarm device, for example AE, via the conductors EL31 and EL32 or EL41, EL42 or EL51 to EL52. In the event of use in large systems, it is possible for two further conductors EL53 and EL54 (see FIG. 5) to be provided, and these, in particular, also permit the remote feeding of active electronic sensors. In the event of using rapid, digital systems, the 2 or 4 conductors can be twisted and provided with a shield, which prevents the alarm signal from being falsified in the event of interference. The conductors can have an insulation, preferably additional insulation, which has a higher melting point than the pipe. The same is true for the covering SR4 enclosing said conductors. This can be achieved, for example, by crosslinking the insulating material. This makes it possible to achieve better emergency running properties. The electric conductors, for example EL31 and EL32, can be used as fire detectors, the distance to the location of the fire being measured directly, for example by means of a pulse reflection, by an appropriate monitoring device (for example AE in FIG. 1 and, in particular, in large buildings). To this end, pulses are fed continuously into at least one of the conductors EL31 and/or EL32, and their propagation time is measured. If a change occurs, because the conductor carrying the measuring pulses, for example EL31, is destroyed or damaged, for example as a result of a fire, then the echo propagation time changes. This can be used to detect a fire.

A measurement of electrical properties, for example of insulation and/or resistance changes in the case of at least one of the conductors EL31 and/or EL32 as a result of a local increase in temperature can also be carried out (for example by the alarm and monitoring device AE in FIG. 1). Even before a fire breaks out, a change in the electrical properties of the adjacent conductors in the extinguishing-line system RO31 may occur in this way, for example as a result of local overheating which has possibly not yet led to a fire. These changes can be registered at a central monitoring point and countermeasures can then be initiated.

What is claimed is:

1. A device for fighting fire in at least one cable or line run containing a cable and/or a line, said device having at least one pipe, which contains a fire-extinguishing agent under positive pressure, being laid continuously in the cable or line run, the wall of said pipe being produced from a material whose melting point is chosen to be equal to or lower than an ignition point of the cable sheath or of the line, the improvement comprising the pipe being fitted with a water vapor barrier.

2. A device according to claim 1, wherein the pipe is assigned at least one storage container for the fire-extinguishing agent.

3. A device according to claim 2, wherein the device is installed in a building and has a plurality of storage containers provided at different heights.

4. A device according to claim 1, which includes a pressure sensor connected to the pipe, so that with a pressure drop, the sensor outputs a signal for a fire alarm.

5. A device according to claim 1, which includes a pressure pump which, in the event of a pressure drop, continues to maintain the pressure in the pipe.

6. A device according to claim 1, wherein the pipe is produced of a material selected from a group consisting of a polyethylene, a copolymer and a combination of a polyethylene and a copolymer.

7. A device according to claim 1, wherein the water vapor barrier is selected from a group consisting of a metal foil, a plastic film and a combination of a metal foil and a plastic film.

8. A device according to claim 1, wherein the water vapor barrier is fitted to the inside of the pipe.

9. A device according to claim 1, wherein the water vapor barrier is fitted to the outside of the pipe.

10. A device according to claim 1, wherein the water vapor barrier is embedded in the wall of the pipe.

11. A device according to claim 1, which includes an alarm device, the pipe being provided with at least one metallic conductive wire provided with an electrical voltage so that with an outbreak of a fire, a change in the electrical properties in the wire triggers a signal in the alarm device.

12. A device according to claim 1, which includes a signal generator and at least who mutually insulated conductors being equipped on the pipe connected to the signal generator.

13. A device according to claim 12, wherein the conductors are surrounded by a shield against interference which has a higher melting point than the pipe.

14. A device according to claim 12, wherein the conductors are surrounded by an insulation having a higher melting point than the pipe.

15. A device according to claim 1, which is arranged in a vehicle.

16. A device for fighting fire in a cable run in a compartment, said device having at least one pipe continuously present in the cable run, and means for maintaining a fire-extinguishing agent under positive pressure in the pipe, said pipe being made of a material having a melting point $\leq$ a lowest ignition point of any material of the cable in the run and said pipe having a water vapor barrier.

* * * * *